US009006474B2

(12) United States Patent
Fukuhara et al.

(10) Patent No.: US 9,006,474 B2
(45) Date of Patent: Apr. 14, 2015

(54) METHOD FOR PRODUCING REFINED A FAT OR OIL

(75) Inventors: Shinpei Fukuhara, Kamisu (JP); Minoru Kase, Kamisu (JP); Tetsuya Abe, Kamisu (JP); Toshiteru Komatsu, Kamisu (JP); Keiji Shibata, Kamisu (JP)

(73) Assignee: Kao Corporation, Tokyo (JP)

( * ) Notice: Subject to any disclaimer, the term of this patent is extended or adjusted under 35 U.S.C. 154(b) by 189 days.

(21) Appl. No.: 13/635,542

(22) PCT Filed: Feb. 25, 2011

(86) PCT No.: PCT/JP2011/054306
§ 371 (c)(1),
(2), (4) Date: Sep. 17, 2012

(87) PCT Pub. No.: WO2011/114863
PCT Pub. Date: Sep. 22, 2011

(65) Prior Publication Data

US 2013/0012734 A1 Jan. 10, 2013

(30) Foreign Application Priority Data

Mar. 17, 2010 (JP) ................................ 2010-060981

(51) Int. Cl.
*C11B 3/04* (2006.01)
*A23D 9/013* (2006.01)
*C11B 3/00* (2006.01)
*C11B 3/14* (2006.01)

(52) U.S. Cl.
CPC ................ *A23D 9/013* (2013.01); *C11B 3/001* (2013.01); *C11B 3/04* (2013.01); *C11B 3/14* (2013.01)

(58) Field of Classification Search
CPC .............. C11B 3/14; C11B 3/04; C11B 3/001
See application file for complete search history.

(56) References Cited

U.S. PATENT DOCUMENTS

| | | | | |
|---|---|---|---|---|
| 4,599,143 | A | 7/1986 | Stage | |
| 4,601,790 | A | 7/1986 | Stage | |
| 4,915,876 | A | 4/1990 | Lindsay | |
| 6,660,491 | B2 * | 12/2003 | Norinobu et al. | 435/19 |
| 6,844,458 | B2 * | 1/2005 | Copeland et al. | 554/212 |
| 7,943,335 | B2 * | 5/2011 | Lai et al. | 435/18 |
| 2002/0098536 | A1 * | 7/2002 | Norinobu et al. | 435/52 |
| 2003/0050492 | A1 | 3/2003 | Copeland et al. | |
| 2006/0161012 | A1 | 7/2006 | Maruyama et al. | |
| 2008/0071101 | A1 | 3/2008 | Maruyama et al. | |
| 2008/0312342 | A1 * | 12/2008 | Lai et al. | 514/772 |
| 2011/0206804 | A1 | 8/2011 | Kase et al. | |
| 2012/0177791 | A1 | 7/2012 | Kase et al. | |
| 2012/0258232 | A1 | 10/2012 | Kase et al. | |

FOREIGN PATENT DOCUMENTS

| | | | |
|---|---|---|---|
| CN | 1356394 | A | 7/2002 |
| CN | 101455242 | A | 6/2009 |
| CN | 101536711 | A | 9/2009 |
| CN | 101659902 | A | 3/2010 |
| EP | 1 157 615 | A2 | 11/2001 |
| EP | 1 157 615 | A3 | 11/2001 |
| EP | 1 209 239 | A2 | 5/2002 |
| EP | 1 209 239 | A3 | 5/2002 |
| EP | 1 674 559 | A1 | 6/2006 |
| EP | 1 746 149 | A1 | 1/2007 |
| GB | 1509664 | A | 5/1978 |
| JP | 59-68398 | A | 4/1984 |
| JP | 3 7240 | | 2/1991 |
| JP | 4 261497 | | 9/1992 |
| JP | 2006 63252 | | 3/2006 |
| JP | 2006-63252 | A | 3/2006 |
| JP | 2006 174808 | | 7/2006 |
| JP | 2009 40854 | | 2/2009 |
| JP | 2011 72219 | | 4/2011 |
| JP | 2011 74358 | | 4/2011 |

OTHER PUBLICATIONS

Maki, K.C, et al., Cosumpti of diacylglycerol oil as part of a reduced-energy diet enhances loss of dody weight and fat in comparison with consumption of a triacylglycerol oil, 2002, Am. J. Clin Nutr, vol. 76, pp. 1230-1236.*

Extended European Search Report issued on Feb. 12, 2014, in European patent Application No. 11756052.4.

Combined Office Action and Search Report issued Mar. 28, 2013 in Chinese Patent Application No. 201180012548.2 with English translation of categories of cited documents.

U.S. Appl. No. 13/634,895, filed Sep. 14, 2012, Abe, et al.

Yunguo Ma, "Processing Technology and Equipments for Oil and Fat", Chemical Industry Publishers, Jan. 2003, pp. 90-96 with cover pages and English translation.

Weisshaar, R., et al., "Fatty acid esters of glycidol in refined fats and oils," European Journal of Lipid Science and Technology, vol. 112, No. 2, pp. 158 to 165, (Feb. 2010).

Bauer, N., "Glycidol-Fettsaeureester in Saeuglingsmilchnahrung nachgewiesen," Dtsch Lebensm Rundsch, vol. 105, No. 6, pp. 361 to 362, (Jun. 2009).

International Search Report Issued May 31, 2011 in PCT/JP11/54306 Filed Feb. 25, 2011.

* cited by examiner

*Primary Examiner* — Yate K Cutliff

(74) *Attorney, Agent, or Firm* — Oblon, McClelland, Maier & Neustadt, L.L.P.

(57) ABSTRACT

A method for manufacturing a refined fat or oil, including: carrying out a first steam treatment of bringing a fat or oil into contact with water vapor; and subsequently carrying out a second steam treatment of bringing the fat or oil having a temperature lower by 10° C. or more than a temperature of the fat or oil in the first steam treatment into contact with water vapor in the presence of an organic acid.

15 Claims, No Drawings

METHOD FOR PRODUCING REFINED A FAT OR OIL

CROSS REFERENCE TO RELATED APPLICATION

This application is a 371 of PCT/JP2011/054306, filed on Feb. 25, 2011, and claims priority to Japanese Patent Application No. 2010-060981, filed Mar. 17, 2010.

FIELD OF THE INVENTION

The present invention relates to a method for manufacturing a refined fat or oil with less by-products, and good taste and flavor.

BACKGROUND OF THE INVENTION

A fat or oil is essential for a human body as nutrients and source of energy supply (the primary function), and moreover, is important for providing so-called sensory function (the secondary function), which satisfies palatability of foods, for example, taste or aroma. In addition, a fat or oil containing diacylglycerols at a high concentration is known to show physiological effects (the third function) such as body fat-burning effect.

An untreated fat or oil obtained by squeezing seeds, germs, pulp, and the like of plants contains, for example, fatty acids, monoacylglycerols, and odor components. Further, when the untreated fat or oil is processed, trace components are generated as by-products through a heating step such as a transesterification reaction, an esterification reaction, or a hydrogenation treatment, resulting in the deterioration of the taste and flavor of the resultant fat or oil. It is necessary to improve taste and flavor by removing these by-products in order to use the fat or oil as an edible oil. Thus, a process of so-called deodorization, in which the fat or oil brought into contact with water vapor under reduced pressure at high temperature, is generally performed (Patent Document 1).

Further, in order to provide good taste and flavor to a diacylglycerol-rich fat or oil, it is reported to adopt a method involving adding an organic acid to a fat or oil rich in diacylglycerols and then carrying out a decoloration treatment with a porous adsorbent, followed by a deodorization treatment, (Patent Document 2), or a method involving carrying out an esterification reaction between glycerin and each of fatty acids obtained by hydrolyzing a raw material fat or oil by an enzymatic decomposition method and then carrying out a deodorization treatment so that the deodorization time and the deodorization temperature can be each controlled in a given range (Patent Document 3).

PRIOR ART DOCUMENT

Patent Document

[Patent Document 1] JP-B-3-7240
[Patent Document 2] JP-A-4-261497
[Patent Document 3] JP-A-2009-40854

SUMMARY OF THE INVENTION

The present invention relates to the following items (1) to (16).

(1) A method for manufacturing a refined fat or oil, including: carrying out a first steam treatment of bringing a fat or oil into contact with water vapor; and subsequently carrying out a second steam treatment of bringing the fat or oil having a temperature lower by 10° C. or more than a temperature of the fat or oil in the first steam treatment into contact with water vapor in the presence of an organic acid.

(2) The method for manufacturing a refined fat or oil according to the item (1), in which the temperature of the fat or oil in the first steam treatment is from 200 to 280° C.

(3) The method for manufacturing a refined fat or oil according to the item (1), in which the temperature of the fat or oil in the first steam treatment is from 230 to 280° C.

(4) The method for manufacturing a refined fat or oil according to the item (1), in which the temperature of the fat or oil in the first steam treatment is from 235 to 275° C.

(5) The method for manufacturing a refined fat or oil according to the item (1), in which the temperature of the fat or oil in the first steam treatment is from 235 to 240° C.

(6) The method for manufacturing a refined fat or oil according to any one of the items (1) to (5), in which the temperature of the fat or oil in the second steam treatment is from 120 to 220° C.

(7) The method for manufacturing a refined fat or oil according to any one of the items (1) to (5), in which the temperature of the fat or oil in the second steam treatment is from 140 to 200° C.

(8) The method for manufacturing a refined fat or oil according to any one of the items (1) to (5), in which the temperature of the fat or oil in the second steam treatment is from 160 to 180° C.

(9) The method for manufacturing a refined fat or oil according to any one of the items (1) to (8), in which the organic acid is added in an amount of 0.01 part by mass or more relative to 100 parts by mass of the fat or oil.

(10) The method for manufacturing a refined fat or oil according to any one of the items (1) to (8), in which the organic acid is added in an amount of from 0.01 to 10 parts by mass relative to 100 parts by mass of the fat or oil.

(11) The method for manufacturing a refined fat or oil according to any one of the items (1) to (8), in which the organic acid is added in an amount of from 0.05 to 5 parts by mass relative to 100 parts by mass of the fat or oil.

(12) The method for manufacturing a refined fat or oil according to any one of the items (1) to (8), in which the organic acid is added in an amount of from 0.1 to 5 parts by mass relative to 100 parts by mass of the fat or oil.

(13) The method for manufacturing refined a fat or oil according to any one of the items (1) to (8), in which the organic acid is added in an amount of from 0.5 to 3 parts by mass relative to 100 parts by mass of the fat or oil.

(14) The method for manufacturing a refined fat or oil according to any one of the items (1) to (8), in which the organic acid is added in an amount of from 1 to 3 parts by mass relative to 100 parts by mass of the fat or oil.

(15) The method for manufacturing a refined fat or oil according to any one of the items (1) to (14), in which the organic acid includes a polyvalent carboxylic acid selected from oxalic acid, malonic acid, succinic acid, glutaric acid, adipic acid, pimelic acid, maleic acid, fumaric acid, phthalic acid, malic acid, tartaric acid, citric acid, trimellitic acid, tricarballylic acid, and 1,3,5-benzene tricarboxylic acid.

(16) The method for manufacturing a refined fat or oil according to any one of the items (1) to (15), in which the refined fat or oil contains diacylglycerols in an amount of 20 mass % or more.

DETAILED DESCRIPTION OF THE INVENTION

In recent years, consumer demand for improvement of quality of an edible fat or oil has been largely growing, and consumers who are sensitive to taste and flavor and appearances have been remarkably increased. Thus, a fat or oil having higher purity and better taste and flavor than conventional ones is desired.

However, the inventor found that a conventional process of deodorization, which has been performed for improving the taste and flavor of a fat or oil, may even increase the amount of by-products. That is, when a deodorization treatment is carried out at low temperature, the effect of distilling odor components is small, resulting in the production of a fat or oil having poor taste and flavor, and hence the deodorization treatment is necessary to be carried out at high temperature, but it has been found that glycidol fatty acid esters are generated as different by-products in the deodorization treatment at high temperature. On the other hand, when a deodorization treatment is carried out at low temperature, the production of by-products can be suppressed to a certain extent, but the improvement of the taste and flavor of the resultant fat or oil insufficient. In particular, a fat or oil rich in diacylglycerols has shown such tendency remarkably.

Accordingly, the present invention relates to providing a method for manufacturing a fat or oil with less by-products and having good taste and flavor.

The inventors of the present invention have made various efforts for studying refining operation of a fat or oil. As a result, the inventors have found that a fat or oil with less by-products can be obtained through treating a fat or oil by bringing the fat or oil into contact with water vapor, and subsequently bringing the fat or oil into contact with water vapor in the presence of an organic acid under a milder condition than the condition under which the preceding treatment of bringing the fat or oil into contact with water vapor is carried out, and have also found that the fat or oil obtained through the above-mentioned treatments have good taste and flavor.

According to the present invention, there is provided a refined fat or oil with less by-products and having good taste and flavor.

A fat or oil used for the manufacturing method of the present invention refers to a fat or oil containing triacylglycerols and/or diacylglycerols.

By-products are easily generated from diacylglycerols in a refining step as compared with triacylglycerols. Thus, it is more preferred to use a fat or oil containing diacylglycerols in the manufacturing method of the present invention. The content of diacylglycerols is preferably 20 mass % (hereinafter, simply described as "%") or more, more preferably 50% or more, and even more preferably 70% or more. The upper limit of the content is not particularly defined, and is preferably 99% or less, more preferably 98% or less, and even more preferably 97% or less.

The fat or oil containing diacylglycerols can be obtained through an esterification reaction between glycerin and fatty acids derived from a raw material fat or oil, a glycerolysis reaction between glycerin and a raw material fat or oil, or the like.

These reactions are preferably carried out under enzymatically mild conditions by using a lipase or the like in view of excellent taste and flavor or the like.

The raw material fat or oil may be any of vegetable fat or oil and an animal fat or oil. Specific examples thereof include rapeseed oil, sunflower oil, corn oil, soybean oil, rice oil, safflower oil, cottonseed oil, beef tallow, linseed oil, and fish oil.

(First Steam Treatment Step)

In the manufacturing method of the present invention, the step of bringing a fat or oil into contact with water vapor, that is, first steam treatment, is carried out at first. The first steam treatment is basically carried out by steam distillation under reduced pressure, and examples thereof include a batch method, a semi-continuous method, and a continuous method. When the amount of fat or oil to be treated is small, the batch method is preferably used, and when the amount is large, the semi-continuous method or the continuous method is preferably used.

Example of apparatus for the semi-continuous method includes a Girdler type deodorization apparatus composed of a deodorization tower equipped with several trays. The treatment is performed in this apparatus by supplying a fat or oil for deodorization from the upper part of the apparatus, bringing the fat or oil into contact with water vapor in a tray for an appropriate period of time, and supplying the fat or oil to the next lower tray so that the fat or oil is successively moved down intermittently.

Example of apparatus for the continuous method includes a thin-film deodorization apparatus filled with structures in which a fat or oil in a thin-film form can be brought into contact with water vapor.

The temperature of a fat or oil in the first steam treatment is preferably from 200 to 280° C. This temperature is preferably from 230 to 280° C., more preferably from 235 to 275° C., and even more preferably from 235 to 240° C., from the standpoints of increasing the efficiency of the treatment and improving the taste and flavor. Note that the phrase "temperature of a fat or oil in steam treatment" as used herein refers to the temperature of a fat or oil at the time of bringing the fat or oil into contact with water vapor.

The contact time is preferably from 0.5 to 120 minutes, more preferably from 1 to 15 minutes, even more preferably from 1 to 10 minutes, even more preferably from 2 to 10 minutes, and even more preferably from 5 to 10 minutes, from the standpoints of increasing the efficiency of the treatment and improving the taste and flavor.

The pressure is preferably from 0.02 to 2 kPa, more preferably from 0.05 to 1 kPa, even more preferably from 0.1 to 0.8 kPa, and even more preferably from 0.3 to 0.8 kPa, from the same standpoints as described above.

The amount of water vapor with which a fat or oil is brought into contact is preferably from 0.1 to 10%, more preferably from 0.2 to 5%, even more preferably from 0.2 to 2%, and even more preferably from 0.5 to 5%, relative to the amount of a fat or oil, from the same standpoints as described above.

(Second Steam Treatment)

In the manufacturing method of the present invention, after the first steam treatment, the step of further bringing the fat or oil into contact with water vapor in the presence of an organic acid, that is, second steam treatment, is carried out.

The organic acid to be used in the manufacturing method of the present invention is preferably a polyvalent carboxylic acid. Examples of the polyvalent carboxylic acid include: dicarboxylic acids such as oxalic acid, malonic acid, succinic acid, glutaric acid, adipic acid, pimelic acid, maleic acid, fumaric acid, phthalic acid, malic acid, and tartaric acid; and tricarboxylic acids such as citric acid, trimellitic acid, tricarballylic acid, and 1,3,5-benzene tricarboxylic acid. One kind or two or more kinds of organic acids may be used.

Of those, citric acid, succinic acid, maleic acid, oxalic acid, and the like are preferably used. In particular, citric acid is preferred from the standpoint of sufficiently reducing by-products.

The addition amount of the organic acid is preferably 0.01 part by mass or more, more preferably from 0.01 to 10 parts by mass, even more preferably from 0.05 to 5 parts by mass, even more preferably from 0.1 to 5 mass, even more preferably from 0.5 to 3 parts by mass, and even more preferably from 1 to 3 mass, relative to 100 parts by mass of the fat or oil, from the standpoint of sufficiently reducing by-products.

The condition of the second steam treatment is preferably milder than that of the first steam treatment. Specifically, the fat or oil having a temperature lower by 10° C. or more than the temperature of the fat or oil in the first steam treatment are preferably brought into contact with water vapor, from the standpoints of the production amount of by-products and the taste and flavor. The temperature of the fat or oil in the second steam treatment is preferably lower by 15° C. or more, more preferably lower by 20° C. or more, even more preferably lower by 40° C. to 100° C., and even more preferably lower by 70° C. to 100° C.

The temperature of the fat or oil in the second steam treatment is preferably 120 to 220° C., more preferably 140 to 200° C., and even more preferably 160 to 180° C., from the same standpoints as described above.

The contact time is preferably 0.5 to 120 minutes, more preferably 1 to 90 minutes, even more preferably 2 to 60 minutes, and even more preferably 34 to 60 minutes, from the standpoints of the production amount of by-products and the taste and flavor.

The pressure is preferably 0.01 to 4 kPa, more preferably 0.05 to 1 kPa, even more preferably 0.1 to 0.8 kPa, and even more preferably 0.3 to 0.8 kPa, from the same standpoints as described above.

The amount of water vapor with which the fat or oil is brought into contact is preferably 0.3 to 20%, more preferably 0.5 to 10%, and even more preferably 1 to 5%, relative to the amount of fat or oil, from the same standpoints as described above.

In the manufacturing method of the present invention, a refining step that is generally used for a fat or oil may be carried out before and/or after each manufacturing step of the fat or oil of the present invention. Specific examples thereof include a top cut distillation step, an acid treatment step, a decoloration step, and a water washing step.

The top cut distillation step refers to a step of distilling a fat or oil, thereby removing light weight by-products such as fatty acids from the fat or oil.

The acid treatment step refers to a step of adding chelating agents such as citric acid to a fat or oil, followed by mixing them, and subsequently subjecting the mixture to dehydration under reduced pressure, thereby removing impurities.

The water washing step refers to a step of bringing a fat or oil into contact with water, thereby performing oil-water separation. Water washing can remove water-soluble impurities. The water washing step is preferably repeated more than once (for example, three times).

As a result of the treatments of the present invention, it is possible to obtain a refined fat or oil with less by-products, in particular, glycidol fatty acid esters, and having good taste and flavor.

Glycidol fatty acid esters can be measured by a method described in the Deutsche Gesellschaft für Fettwissenschaft standard method C-III 18 (09) (DGF Standard Methods 2009 (14. Supplement), C-III 18 (09), “Ester-bound 3-chloropropane-1,2-diol (3-MCPD esters) and glycidol (glycidyl esters)”). This measurement method is a measurement method for 3-chloropropane-1,2-diol esters (MCPD esters) and for glycidol and esters thereof. In the present invention, the method of Option A described in Section 7.1 of the Standard Methods (“7.1 Option A: Determination of the sum of ester-bound 3-MCPD and glycidol”) is used to quantify glycidol esters. The details of the measurement method are described in examples.

Glycidol fatty acid esters and MCPD esters are different substances, but, in the present invention, each value obtained by the above-mentioned measurement method is defined as the content of glycidol fatty acid esters.

The content of glycidol fatty acid esters in the refined fat or oil of the present invention is preferably less than 10 ppm, more preferably 8 ppm or less, even more preferably 5 ppm or less, and even more preferably 3 ppm or less.

Further, the content of diacylglycerols in the refined fat or oil of the present invention is preferably 20% or more, more preferably 50% or more, and even more preferably 70% or more. The upper limit of the content is not particularly defined, and is preferably 99% or less, more preferably 98% or less, and even more preferably 97% or less.

An antioxidant can be added to the refined fat or oil of the present invention as is the case with a general edible fat or oil, for the purpose of improving their storage stability and the stability of their taste and flavor. Examples of the antioxidant include natural antioxidants, tocopherol, ascorbyl palmitate, ascorbyl stearate, BHT, BHA, and phospholipids.

The refined fat or oil of the present invention can be used in exactly the same applications as a general edible fat or oil, and can be widely applied to various foods and beverages in which a fat or oil are used. For example, the refined fat or oil of the present invention can be used in: oil-in-water fat or oil processed foods such as drinks, desserts, ice creams, dressings, toppings, mayonnaises, and grilled meat sauces; water-in-oil fat or oil processed foods such as margarines and spreads; processed a fat or oil foods such as peanut butters, frying shortenings, and baking shortenings; processed foods such as potato chips, snacks, cakes, cookies, pies, breads, and chocolates; bakery mixes; processed meat products; frozen entrees; and frozen foods.

EXAMPLES (Method for Analysis)

(i) Measurement of Glycidol Fatty Acid Esters (in Accordance with Option A of Deutsche Gesellschaft für Fettwissenschaft (DGF) standard method C-III 18(09))

Approx. 100 mg of a fat or oil sample were weighed in a test tube with a lid. 50 μL of an internal standard substance, 500 μL of a t-butyl methyl ether/ethyl acetate-mixed solution (volume ratio of 8 to 2), and 1 mL of 0.5 N sodium methoxide were added to the fat or oil sample, followed by stirring, and the mixture was left to stand still for 10 minutes. 3 mL of hexane and 3 mL of a 3.3% acetic acid/20% sodium chloride aqueous solution were added thereto, followed by stirring, and the upper layer of the mixture was subsequently removed. 3 mL of hexane were further added, followed by stirring, and the upper layer of the mixture was removed. 250 μL of a mixed solution of 1 g of phenylboronic acid/4 mL of 95% acetone were added, followed by stirring, and subsequently the test tube was hermetically sealed and heated at 80° C. for 20 minutes. 3 mL of hexane were added thereto, followed by stirring, and the upper layer of the resultant mixture was subjected to measurement with a gas chromatograph-mass spectrometer (GC-MS) to quantify glycidol fatty acid esters. Note that the case where the content of glycidol fatty acid esters was found to be 0.144 ppm or less was defined as being not detectable (ND).

(ii) Glyceride Composition

Approx. 10 mg of a fat or oil sample and 0.5 mL of trimethylsilylating agent (“Silylating Agent TH” manufactured by Kanto Chemical Co., Inc.) were loaded into a glass sample bottle, hermetically sealed, and heated at 70° C. for 15 minutes. 1.0 mL of water and 1.5 mL of hexane were added thereto, followed by shaking. After standing still, the upper layer was subjected to gas chromatography (GLC) for analysis.

(Taste and Flavor)

The evaluation of taste and flavor of each refined fat or oil was performed by panelists consisting of five members. Each member ate 1 to 2 g of the each refined fat or oil raw, and performed a sensory evaluation based on the criteria shown below. The average of the five evaluations was rounded off to the nearest whole number. Note that when the refined fat or oil is evaluated as 4 or higher, the fat or oil is determined to be highly accepted by consumers.

(Criteria for Evaluation of Taste and Flavor)

5: Very good
4: Good
3: Slightly good
2: Poor
1: Very poor (Preparation of a Fat or Oil)

100 parts by mass of mixed fatty acids comprised of soybean oil fatty acids and rapeseed oil fatty acids, both of which are derived from a non-deodorized raw material fat or oil, in a mass ratio of 7:3 (soybean oil fatty acids:rapeseed oil fatty acids=7:3 (mass ratio) and 15 parts by mass of glycerin were mixed, and the mixture was subjected to an esterification reaction with an enzyme. From the resultant esterified product, fatty acids and monoacylglycerols were removed by top cut distillation, and the resultant was then treated with an acid (10% aqueous solution of citric acid was added in an amount of 2%) and washed with water (three times with distilled water), to yield DAG water-washed oil (containing 91% of diacylglycerols). The DAG water-washed oil contained glycidol fatty acid esters in an amount of 1.8 ppm.

Example 1

The DAG water-washed oil was subjected to a first steam treatment under Condition (1) shown in Table 1, i.e., under conditions of a temperature of a fat or oil of 240° C., a pressure of 0.3 kPa, a contact time of 5 minutes, and a ratio of water vapor/a fat or oil=0.5%. Note that the first steam treatment was carried by using a continuous thin-film deodorization apparatus filled with structures (which was also used in the following examples and comparative examples).

After that, citric acid was added in an amount of 0.01 part by mass relative to 100 parts by mass of the fat or oil by using a 10% aqueous solution of citric acid. Then, a second steam treatment was carried out by using a batch type deodorization apparatus under Condition (2) shown in Table 1, yielding a refined fat or oil.

Example 2

A refined fat or oil was obtained in the same manner as that in Example 1, except that the addition amount of citric acid was set to 0.1 part by mass relative to 100 parts by mass of the fat or oil.

Example 3

A refined fat or oil was obtained in the same manner as that in Example 1, except that the addition amount of citric acid was set to 1 part by mass relative to 100 parts by mass of the fat or oil.

Comparative Example 1

(Omission of Addition of Organic Acid and Second Steam Treatment)

The DAG water-washed oil was subjected to a first steam treatment under Condition (1) shown in Table 1, i.e., under conditions of a temperature of a fat or oil of 240° C., a pressure of 0.3 kPa, a contact time of 5 minutes, and a ratio of water vapor/a fat or oil=0.5%, yielding a refined fat or oil.

Comparative Example 2

(Omission of Second Steam Treatment)

The DAG water-washed oil was subjected to a first steam treatment in the same manner as that in Comparative Example 1. After that, citric acid was added in an amount of 1 part by mass relative to 100 parts by mass of the fat or oil, yielding a refined fat or oil.

Comparative Example 3

(Omission of Addition of Organic Acid)

The DAG water-washed oil was subjected to a first steam treatment in the same manner as that in Comparative Example 1. After that, a second steam treatment was carried out by using a batch type deodorization apparatus under Condition (2) shown in Table 1, i.e., without adding any organic acid, yielding a refined fat or oil.

Comparative Example 4

(Omission of First Steam Treatment and Addition of Organic Acid)

The DAG water-washed oil was subjected to a second steam treatment under Condition (2) shown in Table 1, i.e., without adding any organic acid, yielding a refined fat or oil.

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| Treatment steps | Condition (1) (first steam treatment) | Temperature [° C.] | | | | 240 | | | No treatment |
| | | Pressure [kPa] | | | | 0.3 | | | |
| | | Contact time [min] | | | | 5 | | | |
| | | Water vapor [% - to fats and oils] | | | | 0.5 | | | |
| | Condition (2) (second steam | Addition amount of organic acid | 0.01 | 0.1 | 1 | No addition | 1 | No addition | No addition |

TABLE 1-continued

| | | | Example 1 | Example 2 | Example 3 | Comparative Example 1 | Comparative Example 2 | Comparative Example 3 | Comparative Example 4 |
|---|---|---|---|---|---|---|---|---|---|
| | treatment) | [part by mass] | | | | | | | |
| | | Temperature [° C.] | 170 | 170 | 170 | No treatment | No treatment | 170 | 170 |
| | | Pressure [kPa] | 0.3 | 0.3 | 0.3 | | | 0.3 | 0.3 |
| | | Contact time [min] | 34 | 34 | 34 | | | 34 | 34 |
| | | Water vapor [%/hr - to fats and oils] | 3 | 3 | 3 | | | 3 | 3 |
| | | Water vapor [% - to fats and oils] | 1.7 | 1.7 | 1.7 | | | 1.7 | 1.7 |
| Refined fat or oil | DAG [%] | | 86 | 86 | 83 | 89 | 89 | 88 | 90 |
| | Glycidol fatty acid esters [ppm] | | 9 | 7 | 1 | 10 | 10 | 10 | ND |
| | Evaluation of taste and flavor | | 5 | 5 | 4 | 5 | 1 | 5 | 3 |

Table 1 shows the results.

As evident from Table 1, a refined fat or oil with less glycidol fatty acid esters and with good taste and flavor were able to be obtained by carrying out a first steam treatment of bringing a fat or oil into contact with water vapor, and subsequently carrying out a second steam treatment of bringing the fat or oil into contact with water vapor in the presence of an organic acid under a milder condition than the condition of the first steam treatment. Further, as the addition amount of the organic acid was increased, the content of glycidol fatty acid esters after the second steam treatment was able to be further reduced.

On the other hand, the reduction of the content of glycidol fatty acid esters was not achieved by carrying out only the first steam treatment (Comparative Example 1). Further, when the first steam treatment was carried out, followed only by the addition of the organic acid, but with no second steam treatment being carried out (Comparative Example 2), or when the first steam treatment was carried out and the second steam treatment was carried out without the addition of any organic acid (Comparative Example 3), the reduction of the content of glycidol fatty acid esters was not achieved.

Further, a refined fat or oil manufactured by omitting the second steam treatment in Comparative Example 2 had poor taste and flavor. When a refined fat or oil was manufactured by carrying out only the second steam treatment under a milder condition, the refined fat or oil had a lower content of glycidol fatty acid esters, but had unsatisfactory taste and flavor (Comparative Example 4).

The invention claimed is:

1. A method for manufacturing a refined fat or oil, comprising:

carrying out a first steam treatment of bringing a fat or oil into contact with water vapor;

subsequently carrying out a second steam treatment of bringing the fat or oil having a temperature lower by 10° C. or more than a temperature of the fat or oil in the first steam treatment into contact with water vapor in the presence of an organic acid; and wherein the organic acid is added in an amount of 0.01 part by mass or more relative to 100 parts by mass of the fat or oil.

2. The method for manufacturing a refined fat or oil according to claim 1, wherein the temperature of the fat or oil in the first steam treatment is from 200 to 280° C.

3. The method for manufacturing a refined fat or oil according to claim 1, wherein the temperature of the fat or oil in the first steam treatment is from 230 to 280° C.

4. The method for manufacturing a refined fat or oil according to claim 1, wherein the temperature of the fat or oil in the first steam treatment is from 235 to 275° C.

5. The method for manufacturing a refined fat or oil according to claim 1, wherein the temperature of the fat or oil in the first steam treatment is from 235 to 240° C.

6. The method for manufacturing a refined fat or oil according to claim 1, wherein the temperature of the fat or oil in the second steam treatment is from 120 to 220° C.

7. The method for manufacturing a refined fat or oil according to claim 1, wherein the temperature of the fat or oil in the second steam treatment is from 140 to 200° C.

8. The method for manufacturing a refined fat or oil according to claim 1, wherein the temperature of the fat or oil in the second steam treatment is from 160 to 180° C.

9. The method for manufacturing a refined fat or oil according to claim 1, wherein the organic acid is added in an amount of from 0.01 to 10 parts by mass relative to 100 parts by mass of the fat or oil.

10. The method for manufacturing a refined fat or oil according to claim 1, wherein the organic acid is added in an amount of from 0.05 to 5 parts by mass relative to 100 parts by mass of the fat or oil.

11. The method for manufacturing a refined fat or oil according to claim 1, wherein the organic acid is added in an amount of from 0.1 to 5 parts by mass relative to 100 parts by mass of the fat or oil.

12. The method for manufacturing a refined fat or oil according to claim 1, wherein the organic acid is added in an amount of from 0.5 to 3 parts by mass relative to 100 parts by mass of the fat or oil.

13. The method for manufacturing a refined fat or oil according to claim 1, wherein the organic acid is added in an amount of from 1 to 3 parts by mass relative to 100 parts by mass of the fat or oil.

14. The method for manufacturing a refined fat or oil according to claim 1, wherein the organic acid comprises a polyvalent carboxylic acid selected from the group consisting of oxalic acid, malonic acid, succinic acid, glutaric acid, adipic acid, pimelic acid, maleic acid, fumaric acid, phthalic acid, malic acid, tartaric acid, citric acid, trimellitic acid, tricarballylic acid, and 1,3,5-benzene tricarboxylic acid.

15. The method for manufacturing a refined fat or oil according to claim 1, wherein the refined fat or oil comprises diacylglycerols in an amount of 20 mass % or more.

* * * * *